United States Patent
Liu

(10) Patent No.: US 7,442,446 B2
(45) Date of Patent: Oct. 28, 2008

(54) ALUMINUM NITRIDE PASSIVATED PHOSPHORS FOR ELECTROLUMINESCENT DISPLAYS

(75) Inventor: Guo Liu, Brampton (CA)

(73) Assignee: Ifire IP Corporation, Fort Saskatchewan, Alberta (CA)

(*) Notice: Subject to any disclaimer, the term of this patent is extended or adjusted under 35 U.S.C. 154(b) by 488 days.

(21) Appl. No.: 10/736,020

(22) Filed: Dec. 15, 2003

(65) Prior Publication Data
US 2004/0170864 A1  Sep. 2, 2004

Related U.S. Application Data

(60) Provisional application No. 60/434,639, filed on Dec. 20, 2002.

(51) Int. Cl.
*H01J 1/62* (2006.01)

(52) U.S. Cl. ............. 428/690; 428/917; 428/332; 313/504; 313/506; 313/512

(58) Field of Classification Search ......... 313/504, 313/506, 509, 503, 512; 428/690, 917, 628, 428/332; 252/301.36, 301.365
See application file for complete search history.

(56) References Cited

U.S. PATENT DOCUMENTS

| | | | |
|---|---|---|---|
| 4,188,565 A | 2/1980 | Mizukami | |
| 4,721,631 A | 1/1988 | Endo | |
| 4,897,319 A | 1/1990 | Sun | |
| 4,975,338 A | 12/1990 | Kageyama | |
| 5,372,839 A | 12/1994 | Mikami et al. | |
| 5,432,015 A | 7/1995 | Wu | |
| 5,496,597 A | 3/1996 | Soininen | |
| 5,505,986 A * | 4/1996 | Velthaus et al. | 427/66 |
| 5,598,059 A | 1/1997 | Sun | |
| 5,644,190 A | 7/1997 | Potter | |
| 5,714,274 A | 2/1998 | Sugiura et al. | |
| 6,064,150 A | 5/2000 | Klinedinst | |
| 6,146,225 A | 11/2000 | Sheats | |
| 6,254,806 B1 * | 7/2001 | Valdna et al. | 252/301.6 R |

(Continued)

FOREIGN PATENT DOCUMENTS

DE  3712855  4/1988

(Continued)

OTHER PUBLICATIONS

R. Akila, T. Jacob and A. K. Shukla, "Gibbs Energies of Formation of Rare Earth Oxysulfides", Metallurgical Transactions B, vol. 18B, Mar. 1987, pp. 163-168.

(Continued)

*Primary Examiner*—Bruce H. Hess
*Assistant Examiner*—Camie S Thompson
(74) *Attorney, Agent, or Firm*—Fay Sharpe LLP

(57) ABSTRACT

A novel structure is provided to improve the luminance and operating stability of phosphors used in ac thick film dielectric electroluminescent displays. The novel structure comprises aluminum nitride barrier layers in contact with the phosphor films to prevent phosphor degradation due to reaction with oxygen. The barrier layers can be deposited using vacuum deposition processes that are compatible with the processes used to deposit and anneal the phosphor films. The invention is particularly applicable to phosphors used in electroluminescent displays that employ thick dielectric layers subject to high processing temperatures to form and activate the phosphor films.

28 Claims, 7 Drawing Sheets

U.S. PATENT DOCUMENTS

| | | | |
|---|---|---|---|
| 6,353,286 B1 | 3/2002 | Talin | |
| 6,383,048 B1 | 5/2002 | Yang | |
| 6,399,222 B2* | 6/2002 | Arai et al. | 428/690 |
| 6,416,888 B1 | 7/2002 | Kawamura | |
| 6,456,002 B1 | 9/2002 | Klinedinst | |
| 6,589,674 B2 | 7/2003 | Li | |
| 6,597,108 B2* | 7/2003 | Yano et al. | 313/503 |
| 6,617,782 B2* | 9/2003 | Cheong et al. | 313/503 |
| 2002/0031688 A1 | 3/2002 | Tanabe | |
| 2002/0033688 A1 | 3/2002 | Viti | |
| 2002/0047661 A1 | 4/2002 | Yamazaki | |
| 2002/0050792 A1 | 5/2002 | Shirozu | |
| 2002/0056842 A1 | 5/2002 | Yamazaki | |
| 2002/0079836 A1 | 6/2002 | Tanabe | |
| 2002/0081371 A1 | 6/2002 | Cheong | |
| 2002/0125821 A1* | 9/2002 | Steckl et al. | 313/506 |
| 2002/0125822 A1 | 9/2002 | Graff | |
| 2002/0177008 A1 | 11/2002 | Shirakawa | |
| 2006/0017381 A1* | 1/2006 | Xin et al. | 313/509 |

FOREIGN PATENT DOCUMENTS

| | | |
|---|---|---|
| JP | 1017395 | 1/1989 |
| JP | 1232695 | 9/1989 |
| JP | 02103893 | 4/1990 |
| JP | 2103894 | 4/1990 |
| JP | 3022392 | 1/1991 |
| JP | 4264392 | 9/1992 |
| JP | 08288069 | 11/1996 |
| JP | 10092580 | 4/1998 |
| WO | WO 00/70917 | 11/2000 |

OTHER PUBLICATIONS

J. Ohwaki, Y. Tamura, H. Kozawaguchi, "High-Brightness Blue, Red, and Stable Green Thin-Film Electroluminescent Devices", Review of the Electrical Communications Laboratories, vol. 35, No. 6, 1987, pp. 733-739.

J. Ohwaki, O. Kogure, B. Tsujiyama "Large Area Thin-Film Electroluminescent Display Panels", Review of the Electrical Communications Laboratories, vol. 35, No. 6, 1987, pp. 741-745.

A. Mikami, T. Ikeda, K. Yamamoto, S. Sasaki, "Green-Emitting $Zn_{1-x}Mg_x$:Tb,F Phosphor for Multicolor Thin-Film El Devices", 2000 Proceedings of the 6$^{th}$ International Conference on the Science and Technology of Display Phosphors, pp. 61-64.

* cited by examiner

ALUMINUM NITRIDE PASSIVATED PHOSPHORS FOR ELECTROLUMINESCENT DISPLAYS

This application claims priority from U.S. Provisional Application Ser. No. 60/434,639, filed on Dec. 20, 2002.

FIELD OF THE INVENTION

The present invention relates to improving the luminance and the operating stability of phosphors used for full colour ac electroluminescent displays employing thick film dielectric layers with a high dielectric constant. More specifically, the invention provides aluminum nitride barrier layers in contact with the phosphor film in a thick film dielectric electroluminescent display to minimize or prevent reaction of the phosphor with oxygen and other deleterious species.

BACKGROUND TO THE INVENTION

Thick film dielectric structures as exemplified by U.S. Pat. No. 5,432,015 (the entirety of which is incorporated herein by reference) are known and exhibit superior characteristics to that of traditional thin film electroluminescent (TFEL) displays. High performance red, green and blue phosphor materials have been developed for use with thick film dielectric structures to provide increased luminance performance. These phosphor materials include europium activated barium thioaluminate based materials for blue emission, terbium activated zinc sulfide, manganese activated magnesium zinc sulfide or europium activated calcium thioaluminate based materials for green emission, as well as traditional manganese activated zinc sulfide that can be appropriately filtered for red emission.

A high luminosity full colour thick film dielectric electroluminescent display requires that the thin film phosphor materials used for the red, green and blue sub-pixels be patterned so that the emission spectrum for each colour of pixel is tailored to minimize the attenuation associated with the optical filters needed to achieve the required colour coordinates for each sub-pixel. For relatively low-resolution displays patterning can be achieved by depositing the phosphor materials through a shadow mask. However, for high resolution displays the shadow mask technique does not provide adequate accuracy requiring that photolithographic methods be employed. Photolithographic techniques, as exemplified in U.S. patent application Ser. No. 09/540,288 (the entirety of which is incorporated herein by reference) require the deposition of photoresist films and the etching or lift-off of portions of the phosphor film to provide the required pattern. Deposition and removal of photoresist films and etching and or lift-off of phosphor films requires the use of solvent solutions that contain water or other protic solvents. Traces of these solutions remaining in the display structure following photolithographic processing together with reaction of moisture or oxygen present in the processing environment may react chemically with certain phosphor materials sensitive to oxidation or hydrolysis reactions to cause performance degradation of the completed display. Continued chemical reactions during operation of the display may cause continued performance degradation thereby shortening the life of the display.

To overcome such performance degradation problems, the use of various materials in conjunction with certain phosphor materials has been proposed. Silicon nitride has been proposed for use with terbium activated zinc sulfide and zinc magnesium sulfide phosphors (Mikami et al., 2000 Proceedings of the 6$^{th}$ International Conference on the Science and Technology of Display Phosphors; J. Ohwaki et al., 1987, Review of the Electrical Communications Laboratories Vol. 35).

U.S. Pat. Nos. 4,188,565, 4,721,631, 4,897,319 and 5,644,190 disclose the use of silicon nitride layers or silicon oxynitride layers in conjuction with a manganese activated zinc sulfide phosphor film using a plasma chemical vapour deposition method.

U.S. Pat. Nos. 5,496,597 and 5,598,059 disclose the use of aluminum oxide in conjunction with a terbium doped zinc sulfide for electroluminescent displays. WO 00/70917 discloses an electroluminescent laminate that includes a rare earth activated zinc sulfide material having a diffusion barrier layer of zinc sulfide.

Aluminum nitride has also been proposed for use with EL emitting layers of alkali earth chalcogen compounds in thin film electroluminescent devices as described in U.S. Pat. No. 4,975,338 and JP 02103893. Aluminum nitride has also been used as an insulating thin film layer in organic electroluminescent elements/displays as described in JP 08288069, JP 10092580, U.S. Pat. Nos. 6,146,225, 6,383,048 and 6,416,888 as well as a moisture barrier layer in EL elements as described in U.S. 2002/0079836 and U.S. 2002/0031688. Aluminum nitride as a ceramic substrate has also been proposed as disclosed in U.S. 2002/0177008.

U.S. 2002/0125821 discloses the use of aluminum nitride as a semiconductor material interposed between a conventional manganese activated zinc sulfide phosphor film and a thick film dielectric layer. The device is constructed by annealing the phosphor film, applying a layer of aluminum nitride on top of the annealed phosphor and then screen printing and sintering a thick film dielectric layer thereon such that the aluminum nitride is placed between the phosphor film and the thick film dielectric layer.

While the aforementioned patents and patent applications may teach the use of certain insulator materials such as aluminum nitride in conjunction with conventional zinc sulfide phosphors or within thin film electroluminescent displays, there remains a need to provide specific improved phosphor materials for use within thick film dielectric electroluminescent displays that exhibit improved luminance and a long operating life with minimal degradation.

SUMMARY OF THE INVENTION

The present invention is a passivating or barrier layer for use with a phosphor provided within a thick film dielectric electroluminescent device. More specifically, the present invention is a passivating or barrier layer for use with a phosphor selected from: a rare earth activated barium thioaluminate; a rare earth activated fine grained zinc sulfide; a transition metal activated zinc sulfide; a rare earth or transition metal activated zinc selenide; and a rare earth or transition metal activated zinc sulfo-selenide. The phosphors are used within a thick film dielectric electroluminescent device as described for example in Applicant's U.S. Pat. No. 5,432,015 and U.S. patent application Ser. No. 60/341,790 filed Dec. 21, 2002 (the descriptions of which are incorporated herein by reference in their entirety).

The barrier layer of the present invention helps to improve the luminance and operating life of the phosphor. The barrier layer is comprised of one or more aluminum nitride layers provided on the top (viewing side surface) of the phosphor film and optionally, also on the bottom side of the phosphor film. In a preferred aspect of the invention, the barrier layer is provided on the viewing side surface of the phosphor material.

The barrier layer of the invention acts to prevent or minimize the effect of any chemical species present within the device from reacting with the phosphor. Such chemical species may cause a reduction in the realizable luminance of the phosphor by reducing the efficiency with which electrons are injected into the phosphor during operation of the device by causing a reduction in the efficiency with which electrons interact with the activator species in the phosphor to emit light. Chemical species may also act to reduce the efficiency by which light generated in the phosphor is transmitted from the device to provide useful luminance.

In particular, phosphor degradation may involve reaction of oxygen or water with the phosphor to change the chemical composition of at least a portion of the phosphor. The aluminum nitride passivating layer of the present invention reduces the rate of these reactions by acting as a barrier for oxygen originating from outside of the phosphor layer, such as for example from within the thick dielectric structure of the device, residual species from chemicals used in the photolithographic processes used to pattern the phosphor or from adjacent thin film layers and/or the external environment.

The barrier layer material is selected such that it is not chemically reactive with adjacent layers, particularly with the phosphor material. The chemical reactivity during the fabrication processes for and during the operation of a display device is not readily determinable and therefore this makes the selection of usable material within the display device and in conjunction with the phosphor material difficult.

The present invention has several different embodiments. In one embodiment, a thin aluminum nitride film is provided in contact with the viewing side surface of the inorganic phosphor film within a thick film dielectric electroluminescent display. In another embodiment, an aluminum nitride thin film is provided in contact with both surfaces of an inorganic thin film phosphor within a thick film dielectric electroluminescent display. In yet a further embodiment of the invention, the phosphor film is selected from the group consisting of: (a) an europium or cerium activated alkaline earth thioaluminate, (b) a rare earth activated fine grained zinc sulfide, (c) a transition metal activated zinc sulfide, (d) a rare earth or transition metal activated zinc selenide and (e) a rare earth or transition metal activated zinc sulfo-selenide wherein the aluminum nitride film is provided in contact with the viewing-side surface of the phosphor film. In still a further embodiment of the invention, an aluminum nitride film is provided in contact with both surfaces of the phosphor film.

According to an aspect of the present invention is a stabilized phosphor film having an aluminum nitride barrier layer directly adjacent one or both sides of said phosphor film, wherein said phosphor film is present in a thick film dielectric electroluminescent display.

According to a further aspect of the present invention is a stabilized phosphor film comprising an aluminum nitride thin film in contact with one or both surfaces of an inorganic thin film phosphor film within a thick film dielectric electroluminescent display.

According to an aspect of the present invention is an improved phosphor film for a thick film dielectric electroluminescent display, said phosphor film selected from the group consisting of:
(a) a rare earth activated barium thioaluminate;
(b) a rare earth activated fine grained zinc sulfide;
(c) a transition metal activated zinc sulfide;
(d) a rare earth or transition metal activated zinc selenide; and
(e) a rare earth or transition metal activated zinc sulfo-selenide,
wherein said phosphor film of (a), (b) (d) and (e) is provided with an aluminum nitride barrier layer on a top and/or bottom side of the phosphor film and wherein said phosphor film of (c) is provided with an aluminum nitride barrier layer on the top side of said phosphor film, said aluminum nitride barrier layer improving the stability of the interface between the phosphor film and the display.

According to a further aspect of the invention is a phosphor laminate for use in a thick film dielectric electroluminescent display, said phosphor laminate comprising;
a phosphor thin film layer selected from the group consisting of
(a) a rare earth activated barium thioaluminate;
(b) a rare earth activated fine grained zinc sulfide;
(c) a transition metal activated zinc sulfide;
(d) a rare earth or transition metal activated zinc selenide; and
(e) a rare earth or transition metal activated zinc sulfo-selenide,
and
an aluminum nitride layer provided directly adjacent a top and/or bottom side of the phosphor layer of (a), (b) (d) and (e) and wherein an aluminum nitride layer is provided directly adjacent a top side of said phosphor layer of (c).

According to still a further aspect of the present invention is a thick film dielectric electroluminescent device constructed on a glass or glass ceramic substrate and comprising a phosphor selected from the group consisting of;
(a) a rare earth activated barium thioaluminate;
(b) a rare earth activated fine grained zinc sulfide;
(c) a transition metal activated zinc sulfide;
(d) a rare earth or transition metal activated zinc selenide; and
(e) a rare earth or transition metal activated zinc sulfo-selenide,
wherein said phosphor film of (a), (b) (d) and (e) is provided with an aluminum nitride barrier layer on a top and/or bottom side of the phosphor film to improve the stability of the interface between the phosphor film and the rest of the device and wherein said phosphor film of (c) is provided with an aluminum nitride barrier layer on the top side of said phosphor film.

According to still a further aspect of the invention is a method for making a stabilized phosphor laminate for use in a thick film dielectric electroluminescent device, said method comprising;
i) deposition of a phosphor selected from the group consisting of:
(a) a rare earth activated barium thioaluminate;
(b) a rare earth activated fine grained zinc sulfide;
(c) a transition metal activated zinc sulfide;
(d) a rare earth or transition metal activated zinc selenide; and
(e) a rare earth or transition metal activated zinc sulfo-selenide,
onto a glass or glass ceramic substrate incorporating a first set of address lines and a dielectric layer;
iii) deposition of a layer of aluminum nitride on top of said phosphor film of (a)-(e); and
ii) annealing said phosphor film at a temperature of up to about 1100° C.

In alternative embodiments, an additional layer of aluminum nitride may be provided on the substrate prior to deposition of the phosphor.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the description given herein, and from the accompanying drawings, which are given by way of illustration only and do not limit the intended scope of the invention.

DETAILED DESCRIPTION OF THE INVENTION

The present invention is a passivating or barrier layer for use with phosphor films in thick film dielectric electroluminescent displays. The passivating or barrier layer comprises aluminum nitride used in conjunction with a phosphor material selected from the group consisting of: (a) a rare earth activated alkaline earth thioaluminate, (b) a rare earth activated fine grained zinc sulfide (c) a transition metal activated zinc sulfide (d) a rare earth or transition metal activated zinc selenide, and (e) a rare earth or transition metal activated zinc sulfo-selenide. The aluminum nitride layer is provided in contact with one or both surfaces of the phosphor material which is preferably provided as a thin film within the thick film dielectric electroluminescent device. The aluminum nitride layer functions to improve the electrical and electrochemical stability of the phosphor film and its interface with the rest of the thick film dielectric electroluminescent device.

The aluminum nitride barrier layer helps to minimize migration of oxygen into the phosphor material during device operation as oxygen may react with the phosphor material to cause performance degradation. The aluminum nitride barrier layer acts as a barrier to oxygen migration and/or reacts with the oxygen to tie it up so that it is no longer available to react with the phosphor to an extent to cause a reduction in device luminance. The barrier layer also provides a more favourable interface at the phosphor surface to inhibit electrochemical reactions at these surfaces during device operation that may degrade the performance of the device.

The invention is particularly applicable to electroluminescent devices employing a thick dielectric layer having a high dielectric constant dielectric layer wherein the thick film dielectric material is a composite material comprising two or more oxide compounds that may evolve chemical species that are deleterious to phosphor performance in response to thermal processing or device operation. Furthermore, the surface of the thick dielectric film is rough on the scale of the phosphor thickness resulting in cracks or pinholes through the device structure and contains voids that may contain or absorb deleterious chemical species thus contributing to a loss of luminance and operating efficiency over the operating life of the device. Suitable thick film dielectric devices for which the present invention may be used are described in Applicant's U.S. Pat. No. 5,432,015 and U.S. patent application Ser. No. 60/341,790 filed Dec. 21, 2002 (the disclosures of which are incorporated herein by reference).

Figure 1:
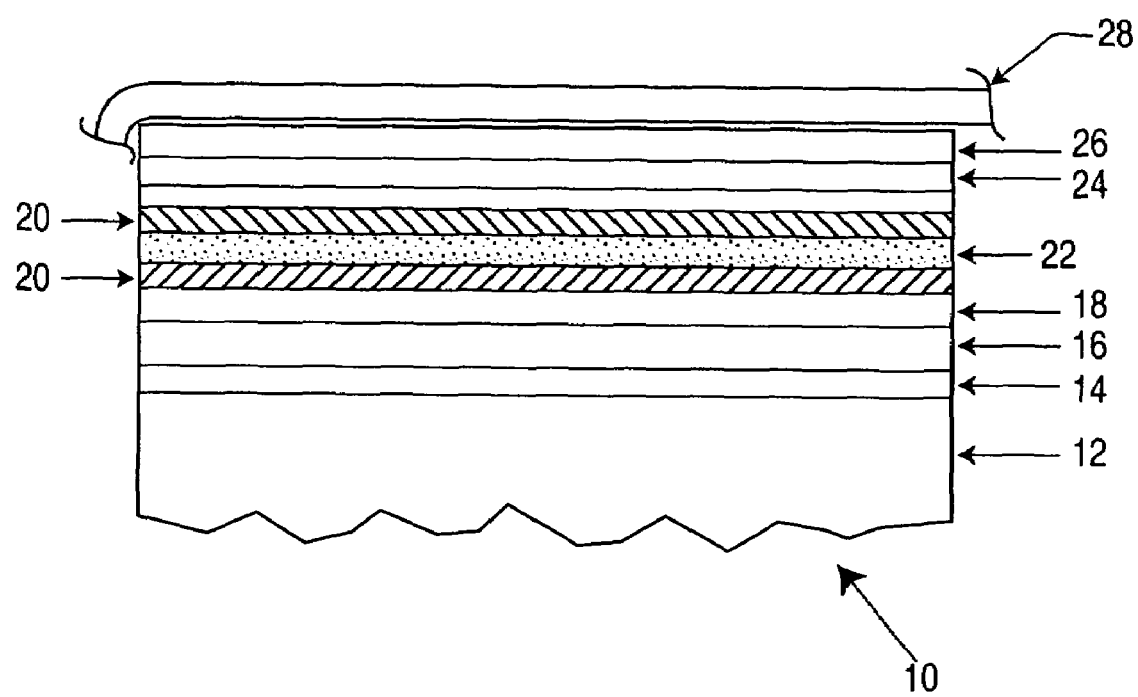
FIG. 1 shows a schematic drawing of the cross section of a thick film dielectric electroluminescent device showing the position of aluminum nitride layer(s) of the present invention.

FIG. 1 shows a schematic drawing of the cross section of a thick film dielectric electroluminescent device of the present invention generally indicated by reference numeral 10. The device 10 has a substrate 12 with a metal conductor layer 14 (ie. gold), a thick film dielectric layer 16 (i.e. PMT-PT) and a smoothing layer 18 (i.e. lead zirconate titanate) thereon. A variety of substrates may be used, as will be understood by persons skilled in the art. The preferred substrate is a substrate that is opaque in the visible and infrared regions of the electromagnetic spectrum. In particular, the substrate is a thick film dielectric layer on a ceramic substrate. Examples of such substrates include alumina, and metal ceramic composites. An aluminum nitride barrier layer 20 is shown to be present adjacent the phosphor layer 22. While the barrier layer 20 is shown on both sides of the phosphor, it is understood that only one such layer may be used. A thin film dielectric layer 24 and then an ITO transport electrode 26 are present above the phosphor. A hermetic enclosure 28 is shown disposed over the laminated structure which is enclosed by a sealing bead.

An important requirement in such a thick film dielectric electroluminescent display is to inhibit electrochemical reactions that may occur and cause device degradation at interfaces between different layers in the device when a voltage is applied across the device during operation. It is now demonstrated that aluminum nitride provides a stable interface with a variety of phosphor materials within the device in particular with thioaluminate phosphors and also with indium tin oxide layers used as optically transparent electrodes under these conditions.

The aluminum nitride layer may be used with thioaluminate phosphors comprising a material of the formula $AB_xC_y$:RE where A is selected from one or more of the group consisting of Mg, Ca, Sr and Ba; B is selected from one or more of the group consisting of Al, Ga and In; C is selected from one or more of the group consisting of S and Se and may also include oxygen at a relative atomic concentration that is less than 0.2 of the combined S and Se concentrations; and RE is selected from a rare earth activator species that generate the required light spectrum and is preferably Eu or Ce. The aluminum nitride barrier layer of the present invention is also suitable as a barrier layer for rare earth activated fine grained zinc sulfide phosphors, transition metal activated zinc sulfide phosphors (such as for example manganese or terbium activated zinc sulfide), rare earth or transition metal activated zinc selenide phosphors and rare earth or transition metal activated zinc sulfo-selenide phosphors.

The rare earth activated fine grained zinc sulfide phosphors are as those described in Applicant's co-pending patent application Ser. No. 60/406,661 filed Aug. 29, 2002 (the disclosure of which is incorporated herein in its entirety). Briefly, the zinc sulfide phosphors for the invention can be represented by the formula ZnS:RE where RE is a rare earth metal selected from the group consisting of terbium and europium. Terbium is most preferred for use in the invention. The atomic ratio of terbium or europium to zinc is in the range of about 0.005 to about 0.02 and in some aspects in the range of about 0.01 to 0.02. The zinc sulfide phosphors are fine grained rare earth-activated zinc sulfide phosphor films wherein the crystal structure of the zinc sulfide comprises the zincblende (sphalerite) crystal structure with the (111) crystallographic direction substantially aligned in a direction perpendicular to the plane of the film.

The zinc sulfo-selenide phosphor material may be represented by $ZnS_xSe_{1-x}$:A where 0<x<1 and A is an activating element. The zinc selenide phosphor material may be represented by ZnSe:A where A is an activating element. The transition metal activated zinc sulfide phosphor material may be represented by ZnS:A where A is selected from manganese and terbium.

The present invention is particularly directed towards improving the operating life of rare earth-activated alkaline earth thioaluminate phosphor materials, rare earth-activated fine grained zinc sulfide phosphor materials, manganese activated zinc sulfide phosphor materials, zinc selenide phosphor materials and zinc sulfo-selenide phosphor materials as described supra. The various phosphor materials being provided within a thick film dielectric electroluminescent display. While the detailed mechanism for stabilizing these phosphors is not understood and not being bound to any theory, preventing oxygen from reacting with the phosphors may help ensure that the rare earth activator species remain dissolved in the crystal lattice of the host thioaluminate compounds. Reaction of the phosphor with oxygen may cause precipitation of aluminum oxide from the phosphor, causing the remaining material to become more barium rich. While many different thioaluminate compounds exist with different ratios of alkaline earth elements to aluminum, not all of them are efficient phosphor hosts. Further, the rare earth species may come out of solution in the host thioaluminate to precipitate as oxysulfide species such as $RE_2O_2S$ where RE represents a rare earth element. The formation of these compounds in a sulfur-bearing environment at very low oxygen partial pressure is well known, as for example described in an article by R. Akila et al, Metallurgical Transactions, Volume 18B (1987) pp. 163-8. The provision of the aluminum nitride layers of the present invention helps to minimize or prevent such undesirable reactions as described.

It is now demonstrated that aluminum nitride has several advantages compared to conventional thin film dielectric materials used in electroluminescent displays. The aluminum nitride barrier layers of the invention have an optical index of refraction closer to that of thioaluminate phosphor materials compared to traditional dielectric layers (such as aluminum oxide) in contact with the viewing-side surface of the phosphor film and through which light generated in the phosphor layer must pass. The improved matching of the optical index of refraction increases the light transmitted through the dielectric layer to improve overall luminosity. Aluminum nitride is also stable against dielectric breakdown in the presence of high electric fields present during the operation of an ac thick film dielectric electroluminescent device. Furthermore, aluminum nitride, compared to the conventional thin film dielectric materials used in electroluminescent displays, have been found to include a relatively high dielectric constant of 13 to 15 as compared to 8 to 10 for silicon nitride and 7 to 8 for alumina. This minimizes the voltage drop across the dielectric layer, thereby reducing the display operating voltage, a relatively high dielectric breakdown strength of 0.5 to 1 megavolts per centimeter. In turn, this facilitates a stable interface between the phosphor layer and the adjacent aluminum nitride layer to provide stable charge injection into the phosphor layer, low residual film stress to prevent cracking or delamination of the film and a high optical index of refraction of about 2.0 that enhances light extraction from the phosphor.

The residual stress in aluminum nitride films can be minimized by appropriate control of the deposition atmosphere for reactive rf sputtering of aluminum nitride, in particular the nitrogen to argon ratio in the sputtering atmosphere. Typically, aluminum nitride films can be sputtered under an argon/nitrogen atmosphere at a pressure in the range of about 0.65 Pa to 3.5 Pa and with a nitrogen to argon ratio of about 0:50 to 20:50. The ratio should be close to about 5:50 to deposit low stress films on thioaluminate phosphor films. The rf power density applied to an aluminum nitride sputtering target for deposition may be in the range of about 2 watts per square centimeter to about 6 watts per square centimeter of active target area. The deposition substrate may be near ambient temperature during aluminum nitride deposition. The thickness of the aluminum nitride film is in aspects in the range of about 30 nanometers to about 50 nanometers and any sub range or ranges between 30 to 50 nanometers. The aluminum nitride can also be provided as one layer or two or more layers on each side of the phosphor material up to the desired thickness. The aluminum nitride sputtering rate tends to decrease as the pressure of the sputtering atmosphere is increased, as is the optical index of refraction, assumedly due to a concomitant increase in the partial pressure of oxygen contained as an impurity in the sputtering atmosphere. The optical index of refraction also decreases with a decreasing nitrogen partial pressure during sputtering, with the film becoming black as the nitrogen partial pressure is reduced to zero. This may be related to a nitrogen deficiency in the deposited film. The nitrogen and argon partial pressures may be set to achieve both a high optical index of refraction and a low residual stress in the deposited film. The residual stress in aluminum nitride films is significantly lower than that of silicon nitride films.

Figure 2:
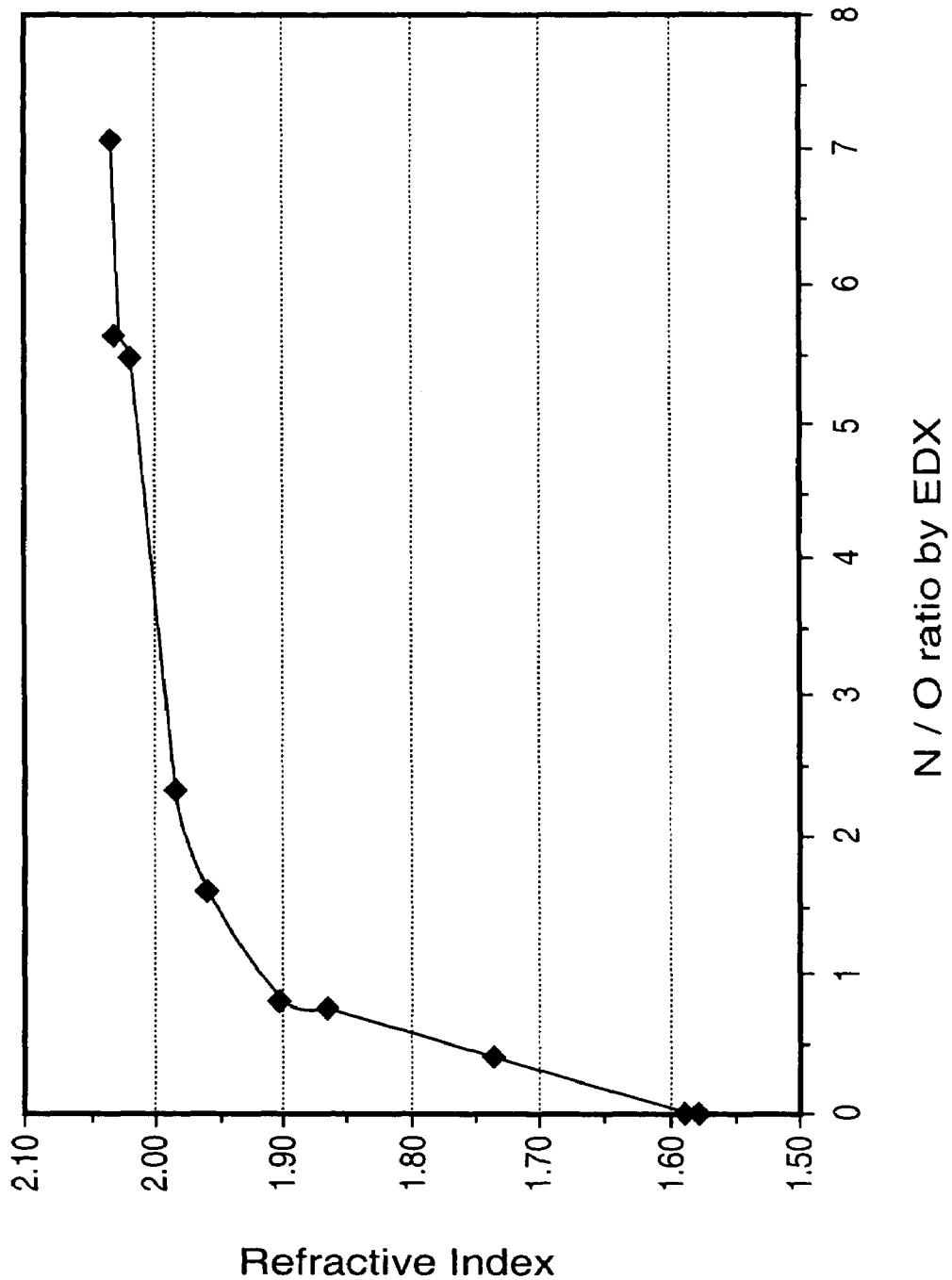
FIG. 2 is a graph showing the optical index of refraction of an aluminum oxynitride film as a function of the oxygen to nitrogen ratio in the film

In addition to sputtering, other methods may be used to deposit the aluminum nitride film as is understood by one of skill in the art. Atomic layer chemical vapour deposition (ALCVD) methods for depositing aluminum nitride films are known in the art. The use of ALCVD may provide a more conformal film of aluminum nitride. In a further aspect of the invention, oxygen may be added to the aluminum nitride film to change its optical index of refraction to match that of adjacent layers to minimize reflection at the interface between the layers. FIG. 2 shows the dependence of the optical index of refraction on the nitrogen to oxygen ratio in the film as measured using energy dispersive x-ray analysis (EDX). The index varies from less than 1.6, corresponding to that of aluminum oxide, if the nitrogen to oxygen ratio is close to zero, to about 2.0 for nitrogen to oxygen ratios in the film greater than about 3:1. Typically, an optical index of refraction near 2 is desirable, providing a best match to the high optical index of refraction of the phosphor materials.

The use of thin film aluminum nitride layers in contact with phosphor films as described herein facilitates varying degrees of luminosity improvement, depending on the composition of the phosphor material. For devices with a manganese activated zinc sulfide phosphor film, the improvement is in the range of about 10 to 15%, for a sputtered terbium activated zinc sulfide phosphor the improvement is in the range of about 10 to 30% and for a europium activated barium thioaluminate film the improvement is in the range of about 30 to 40%.

One embodiment of the present invention is the provision of a thin film aluminum nitride layer deposited on top of a phosphor film selected from the group consisting of: a rare earth activated barium thioaluminate wherein the ratio of aluminum to barium is between 2 and 4; a rare earth activated fine grained zinc sulfide; a transition metal activated zinc sulfide; a rare earth or transition metal activated zinc selenide; and a rare earth or transition metal activated zinc sulfo-selenide. This structure is provided within a thick film dielectric electroluminescent device as described herein. An indium tin oxide transparent conductor film is deposited on the aluminum nitride layer.

A second embodiment of the invention is an ac thick film dielectric electroluminescent device having: a thick dielectric layer; a phosphor film selected from the group consisting of a rare earth activated barium thioaluminate wherein the ratio of aluminum to barium is between 2 and 4; a rare earth activated fine grained zinc sulfide; a transition metal activated zinc sulfide; a rare earth or transition metal activated zinc selenide; and a rare earth or transition metal activated zinc sulfo-selenide; a thin film aluminum nitride layer deposited on the phosphor film; a second thin film dielectric layer of a different composition deposited on the aluminum nitride layer; and an indium tin oxide transparent conductor film deposited on the second dielectric layer.

A third embodiment of the present invention is an ac thick film dielectric electroluminescent device having a thick dielectric layer and a phosphor film selected from the group consisting of a rare earth activated barium thioaluminate wherein the ratio of aluminum to barium is between 2 and 4; a rare earth activated fine grained zinc sulfide; a transition metal activated zinc sulfide; a rare earth or transition metal activated zinc selenide; and a rare earth or transition metal activated zinc sulfo-selenide and having a thin film aluminum nitride layer in contact with both surfaces of the phosphor film.

A fourth embodiment of the present invention is an ac thick film dielectric electroluminescent device of any of the first through third embodiments described supra, in which the phosphor composition includes magnesium with the ratio of the atomic concentration of magnesium to barium plus magnesium being in the range of about 0.001 to 0.2.

A fifth embodiment of the invention is an ac thick film dielectric electroluminescent device of any of the first to fourth embodiments where the phosphor is activated with trivalent europium orcerium, and preferably europium, and the atomic ratio of europium or cerium to barium or barium plus magnesium is in the range of about 0.005 to 0.04 and preferably in the range of about 0.015 to 0.03.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

A thick film dielectric electroluminescent device incorporating thin film phosphor layers comprising barium thioaluminate activated with europium was constructed. The thick film substrate comprised a 5 cm by 5 cm alumina substrate having a thickness of about 0.1 cm. A gold electrode was deposited on the substrate, followed with a thick film high dielectric constant dielectric layer in accordance with the methods exemplified in Applicant's co-pending international application PCT CA00/00561 filed May 12, 2000 (the entirety of which is incorporated herein by reference). A thin film dielectric layer consisting of barium titanate, with a thickness of about 100-200 nanometers, was deposited on top of the thick film dielectric layer using the sol gel technique described in Applicant's co-pending U.S. patent application Ser. No. 09/761,971 filed Jan. 17, 2001 (the entirety of which is incorporated herein by reference). A 400 nm thick barium magnesium thioaluminate phosphor film activated with about 3 atomic percent of europium with respect to barium was electron beam deposited on the barium titanate layer according to the methods of the Applicant's U.S. patent application Ser. No. 09/747,315 (the entirety of which is incorporated herein by reference). Following deposition the deposited phosphor was annealed under nitrogen in a belt furnace with a peak temperature of about 700° C. for 12 minutes.

A 50 nm thick aluminum nitride layer was then sputter-deposited using a 38 cm by 12 cm by 0.64 cm thick rectangular target. The sputtering atmosphere was maintained by injecting nitrogen at a rate of 5 sccm and argon at 50 sccm into the sputtering chamber to maintain a pressure of about 0.7 Pa. The substrate was at ambient temperature prior to the deposition. The rf power to the sputtering target was about 2000 watts. The deposition rate was about 4 to 6 Angstroms per second. Energy-dispersive x-ray spectroscopic analysis of the film showed that it contained an atomic ratio of oxygen to nitrogen of less than 0.2. X-ray diffraction analysis of aluminum nitride films sputtered on to a silicon wafer under similar conditions showed that the as-deposited film had a largely amorphous structure with a small fraction of crystalline aluminum nitride and that a similar film subsequently annealed at 450° C. was substantially crystallized with a hexagonal crystal structure and with the crystallographic c-axis oriented preferentially in a direction perpendicular to the film surface. The preferred orientation was measured using an x-ray diffractometer fitted with an area detector.

An indium tin oxide upper conductor film was next deposited according to the methods of Applicant's co-pending international application PCT CA00/00561 (the entirety of which is incorporated herein by reference) and the completed device was annealed in air at about 550° C. and then annealed under nitrogen at about 550° C. following deposition of the indium tin oxide and prior to testing.

Figure 3:
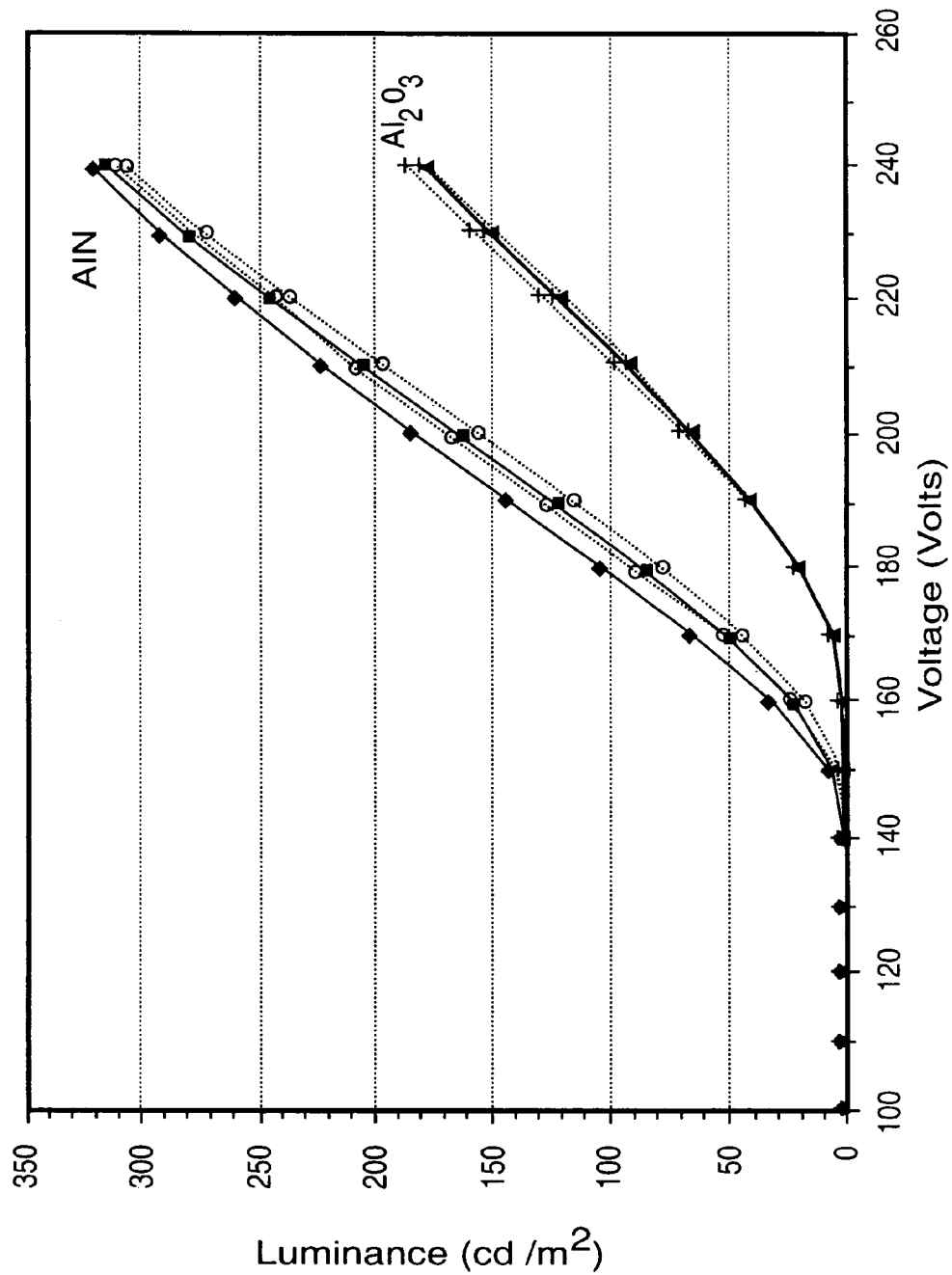
FIG. 3 is a graph showing the luminance of several thick film dielectric electroluminescent devices having a barium thioaluminate phosphor in contact with aluminum nitride and aluminum oxide films.

The device was tested by applying a 240 Hz alternating polarity square wave voltage waveform with a pulse width of 30 nanoseconds and an of amplitude 60 volts about the optical threshold voltage. FIG. 3 shows the luminance as a function of applied voltage for the device. As can be seen from the data the luminance at 60 volts above the threshold voltage of 145 volts was about 180 candelas per square meter.

Example 2

A device was constructed similar to that of example 1, except that the aluminum nitride dielectric layer was replaced by an alumina layer of similar thickness. The luminance data for this device is also shown in FIG. 3 and shows a luminance of about 120 candelas per square meter at 60 volts above its threshold voltage of 160 volts. The lower threshold voltage of the device with the aluminum nitride layer is attributed to the higher dielectric constant for aluminum nitride as compared to alumina. The luminance at 60 volts above the threshold voltage for the device with the aluminum nitride layer is about 40% higher than that for the device with the aluminum oxide layer.

Example 3

Figure 4:
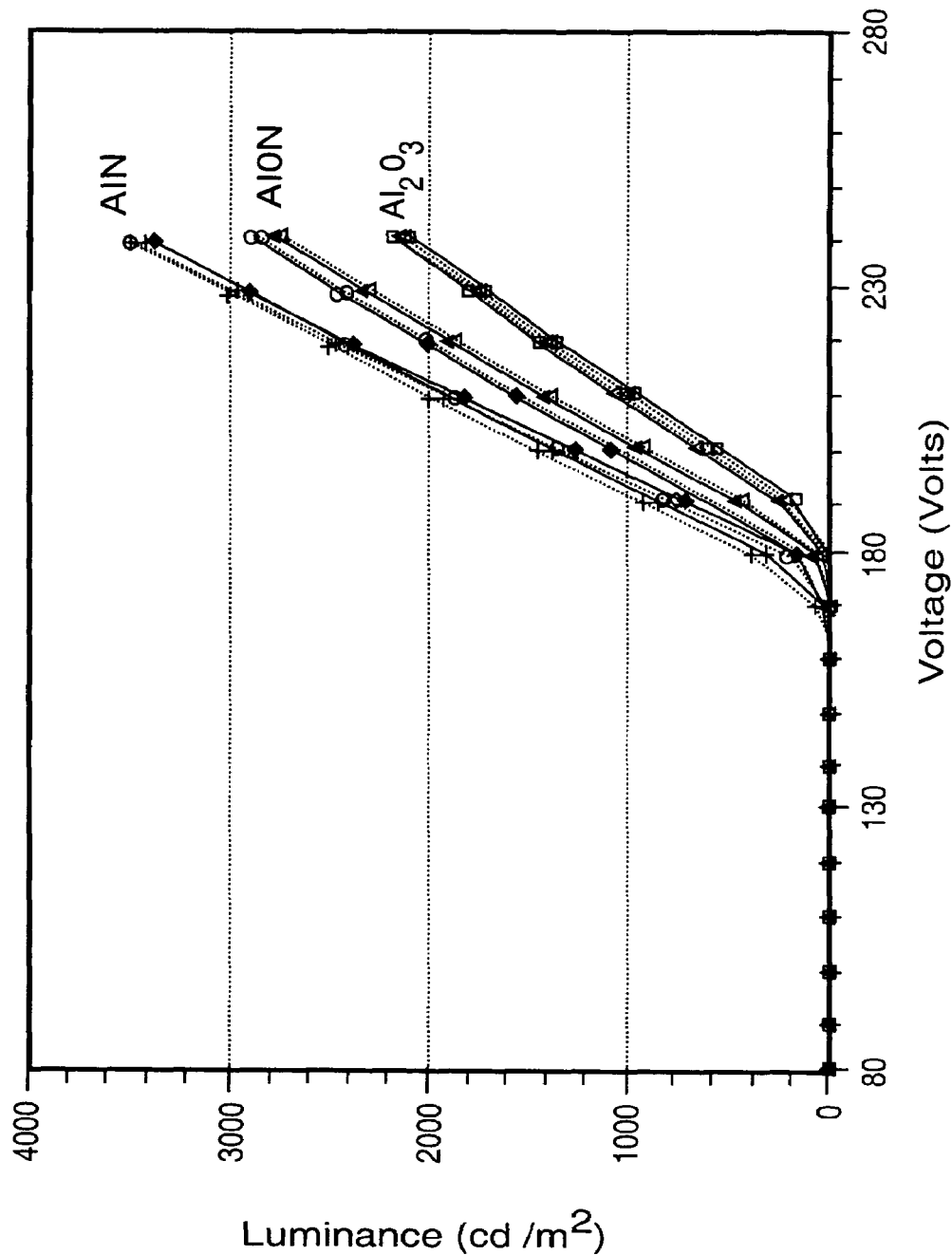
FIG. 4 is a graph showing the luminance of several thick film dielectric devices having a terbium activated zinc sulfide phosphor in contact with aluminum nitride, aluminum oxynitride and aluminum oxide films.

A device was constructed similar to that of example 1, except that the phosphor layer was sputtered terbium activated zinc sulfide rather than europium activated barium thioaluminate, with a thickness of about 700 nanometers. The luminance as a function of voltage for this device under the same test conditions is shown in FIG. 4. As can be seen from the data the luminance at 60 volts above the threshold voltage of 170 volts was about 3000 candelas per square meter.

Example 4

A device similar to that of example 3, except that the aluminum nitride dielectric layer was replaced by an alumina layer of similar thickness. The luminance data for this device under the same test conditions is also shown in FIG. 4 and shows a luminance of about 2100 candelas per square meter at 60 volts above its threshold voltage of 180 volts. As with the devices with the europium activated barium thioaluminate phosphor, the device of this example has a higher threshold voltage than the device of example 3 with the aluminum nitride layer, again attributed to the higher dielectric constant for aluminum nitride as compared to alumina. The luminance at 60 volts above the threshold voltage for the device with the aluminum nitride layer is about 40% higher than the corresponding luminance for the device with the alumina layer.

Example 5

A device similar to that of example 3, except that the aluminum nitride layer was doped with oxygen to form aluminum oxynitride. As shown in FIG. 4, the threshold voltage and luminance values are between those for devices with pure aluminum nitride and alumina layers.

Example 6

Figure 5:
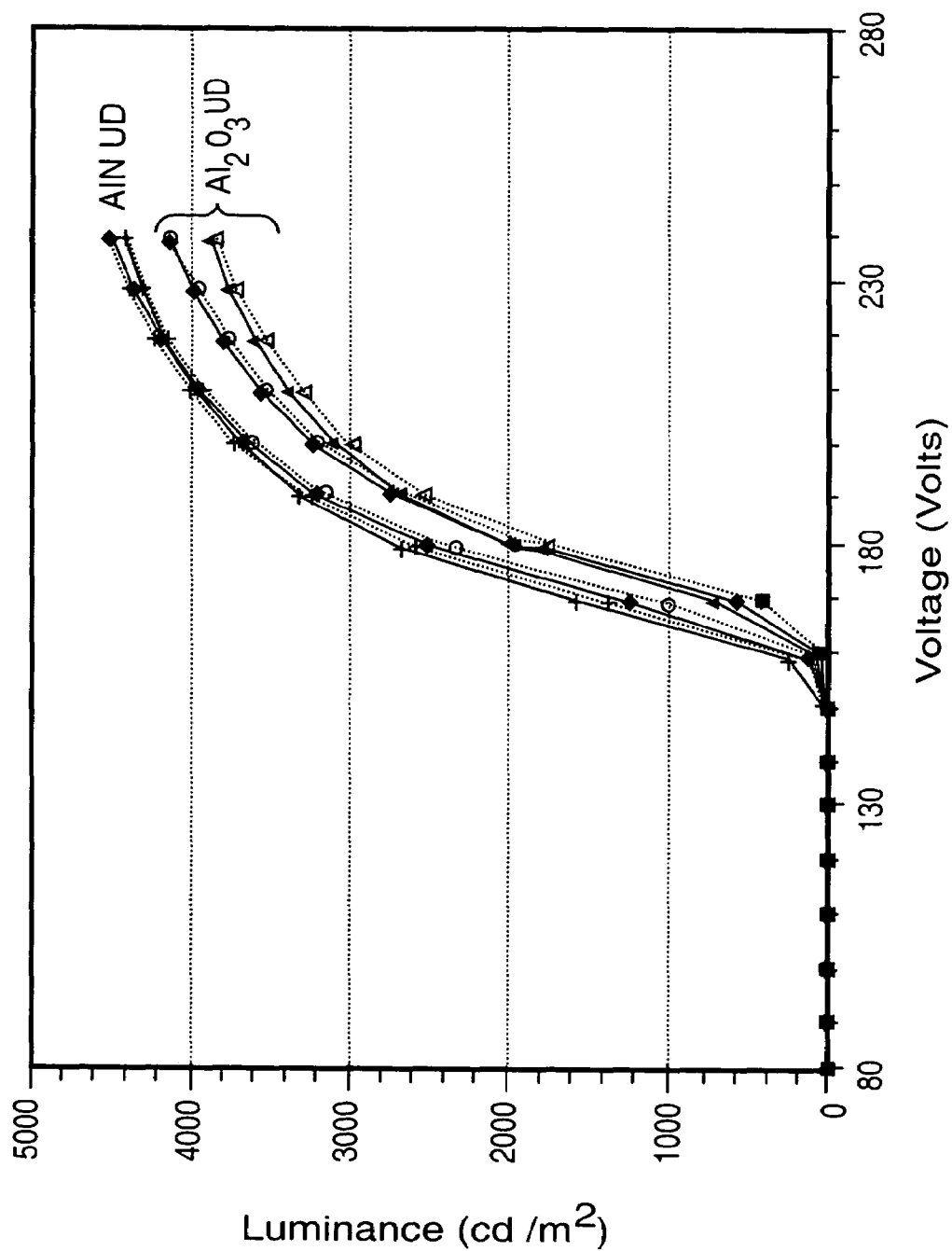
FIG. 5 is a graph showing the luminance of several thick film dielectric devices having a manganese activated zinc sulfide phosphor in contact with aluminum nitride and aluminum oxide films.

A device was constructed similar to that of example 1, except that the phosphor layer was manganese activated zinc sulfide rather than europium activated barium thioaluminate, with a thickness of about 860 nanometers. The luminance as a function of voltage for this device under the same test conditions is shown in FIG. 5. As can be seen from the data the luminance at 60 volts above the threshold voltage of 155 volts was about 4000 candelas per square meter.

Example 7

A device similar to that of example 6, except that the aluminum nitride dielectric layer was replaced by an alumina layer of similar thickness. The luminance data for this device under the same test conditions is also shown in FIG. 5 and shows a luminance of about 3700 candelas per square meter at 60 volts above its threshold voltage of 160 volts. As with the devices with the europium activated barium thioaluminate phosphor, the device of this example has a higher threshold voltage than the device of example 3 with the aluminum nitride layer, although the difference is smaller for these examples. The luminance at 60 volts above the threshold voltage for the device with the aluminum nitride layer is about 10% higher than the corresponding luminance for the device with the alumina layer.

Example 8

Figure 6:
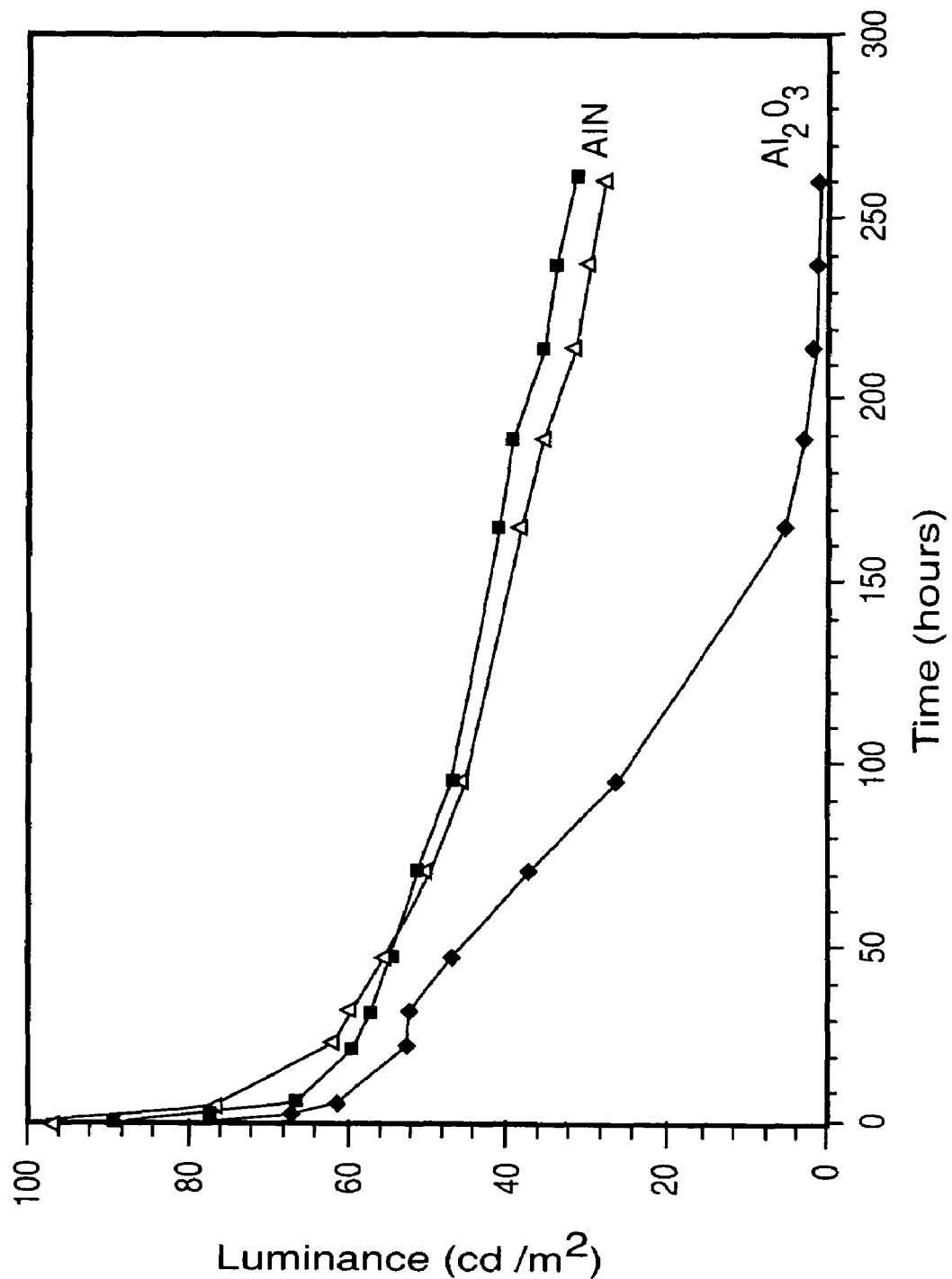
FIG. 6 is a graph showing the luminance as a function of operating time for thick film dielectric electroluminescent devices having a europium activated barium thioaluminate phosphor in contact with aluminum nitride and aluminum oxide films.

Two devices similar to those of examples 1 and 2 were constructed and subjected to life testing under the same driving conditions. FIG. 6 shows comparative life data for electroluminescent devices with aluminum nitride and with alumina upper dielectric layers showing that aluminum nitride films deposited on top of thioaluminate phosphor films has a stabilizing effect on the thioaluminate phosphor. The data shows that the luminance dropped to zero after 200 hours for the device with the alumina upper dielectric layer, but decreased much more slowly following an initial burn-in period for the device with the aluminum nitride layer.

Example 9

Figure 7:
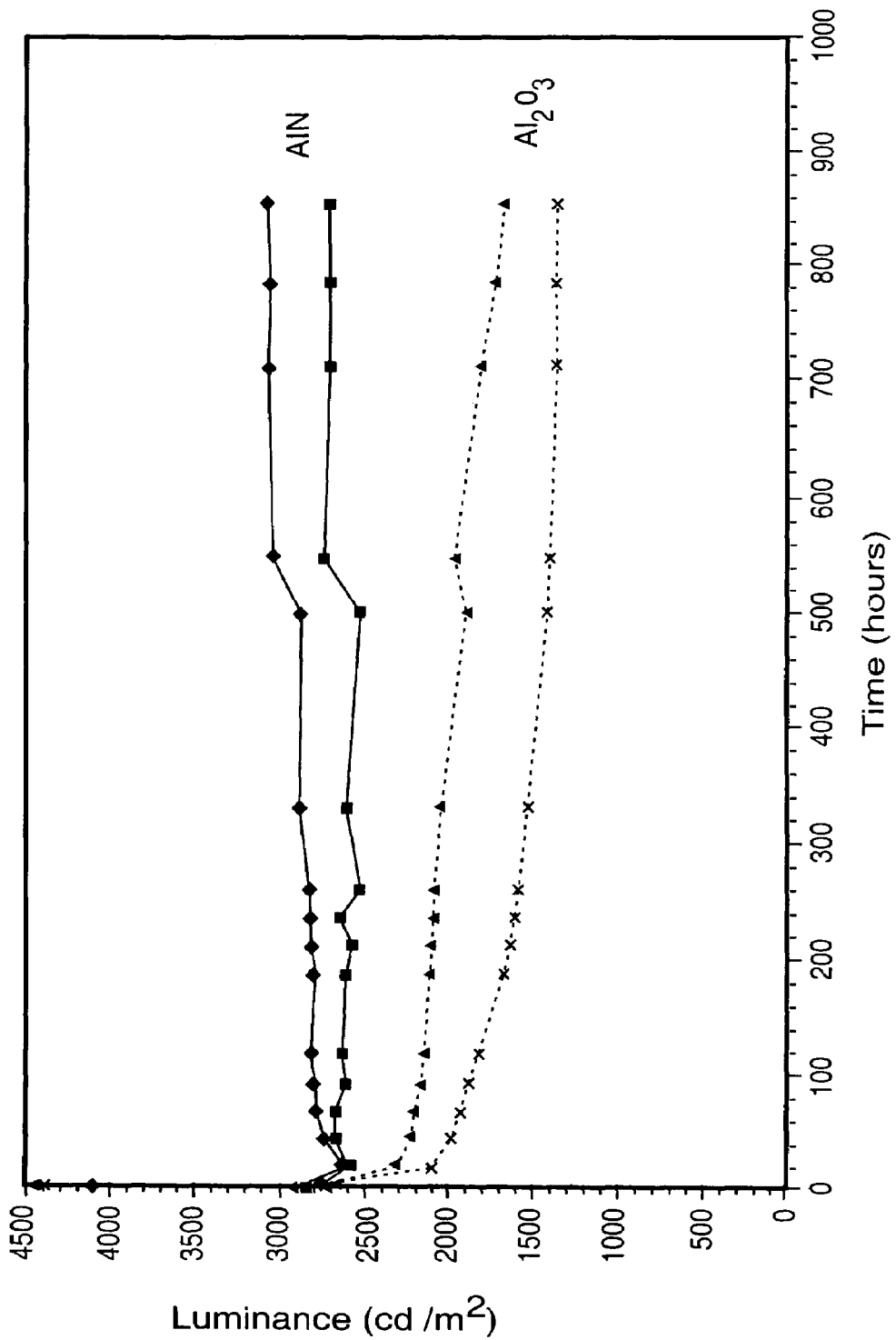
FIG. 7 is a graph showing the luminance as a function of operating time for thick film dielectric electroluminescent devices having a terbium activated zinc sulfide phosphor in contact with aluminum nitride and aluminum oxide films.

Four devices having a terbium activated zinc sulfide phosphor, two similar to those of example 3 with an aluminum nitride upper dielectric layer and two similar to those of example 4 with an alumina upper dielectric layer were constructed and subjected to life testing at a drive frequency of 600 Hz under the same driving conditions. FIG. 7 shows comparative life data for electroluminescent devices with the aluminum nitride and with the alumina upper dielectric layers showing that aluminum nitride films has a stabilizing effect on the zinc sulfide phosphor. The data shows that the initial luminance for the former devices was more than 2700 candelas per square meter with no substantial change over 850 operating hours whereas the latter devices had a similar initial luminance, but a sharp initial drop to about 2200 candelas per square meter, and a steady decline following the initial drop to around 1500 candelas per square meters after 850 hours of testing.

Although preferred embodiments of the invention have been described herein in detail, it will be understood by those skilled in the art that variations may be made thereto without departing from the spirit of the invention or the scope of the appended claims.

The invention claimed is:

1. An improved phosphor film for a thick film dielectric electroluminescent display, said phosphor film selected from the group consisting of
    (a) a rare earth activated alkaline earth phosphor having the formula $AB_xC_y$:RE wherein;
       A is selected from one or more of the group consisting of Mg, Ca, Sr and Ba;
       B is selected from one or more of the group consisting of Al, Ga and In;
       C is selected from one or more of the group consisting of S and Se; and RE is a rare earth activator species;
    (b) a rare earth or transition metal activated zinc selenide; and
    (c) a rare earth or transition metal activated zinc sulfoselenide, wherein said phosphor film of (a), (b) and (c) is provided with an aluminum nitride barrier layer on a top and/or bottom side of the phosphor film, and said aluminum nitride barrier layer has a thickness in a range of about 30 nm to about 50 nm when used in conjunction with said rare earth activated alkaline earth phosphor.

2. The phosphor film of claim 1, wherein said rare earth activated alkaline earth phosphor comprises a thioaluminate phosphor.

3. The phosphor film of claim 2, wherein C may also include oxygen at a relative atomic concentration that is less than 0.2 of the combined S and Se concentrations.

4. The phosphor film of claim 2, wherein RE is selected from the group consisting of Eu and Ce.

5. The phosphor film of claim 1, wherein said aluminum nitride barrier layer is provided on top of said phosphor of (a) to (c).

6. The phosphor film of claim 1, wherein said aluminum nitride barrier layer is provided on the bottom of said phosphor of (a), (b), and (c).

7. The phosphor of claim 1, wherein said aluminum nitride barrier layer is provided on the top and bottom of said phosphor of (a) to (c).

8. The phosphor of claim 1, wherein said aluminum nitride barrier layer is about 30 nm to about 50 nm thick.

9. The phosphor of claim 8, wherein said aluminum nitride barrier layer is deposited by sputtering.

10. The phosphor of claim 8, wherein said aluminum nitride barrier layer is deposited by atomic layer chemical vapour deposition.

11. The phosphor of claim 8, wherein said aluminum nitride barrier layer has a optical index of refraction of up to about 2.0.

12. The phosphor of claim 9, wherein said sputtering is conducted in a sputtering atmosphere of gases at a pressure of about 0.65 Pa to 3.5 Pa having a nitrogen to argon ratio of about 0:50 to 20:50 and a power density of about 2 to 6 watts per square centimeter.

13. The phosphor of claim 12, wherein oxygen is added to said sputtering atmosphere.

14. The phosphor of claim 1, wherein said zinc sulfoselenide is represented by the formula $ZnS_xSe_{1-x}:A$ where $0<x<1$ and A is an activating element.

15. The phosphor of claim 1, wherein said zinc selenide phosphor material is represented by ZnSe:A where A is an activating element.

16. A phosphor laminate for use in a thick film dielectric electroluminescent display, said phosphor laminate comprising; a phosphor thin film layer selected from the group consisting of
(a) a rare earth activated alkaline earth thioaluminate;
(b) a rare earth or transition metal activated zinc selenide; and
(c) a rare earth or transition metal activated zinc sulfoselenide, an aluminum nitride layer provided directly adjacent a top and/or bottom side of the phosphor layer of (a), (b) and (c), and wherein said aluminum nitride barrier layer has a thickness of about 30 nm to about 50 nm.

17. The laminate of claim 16, wherein said phosphor thin film layer is (a) and said aluminum nitride barrier layer is provided on the top side of said phosphor thin film layer.

18. A thick film dielectric electroluminescent device constructed on a glass or glass ceramic substrate and comprising a phosphor selected from the group consisting of
(a) a rare earth activated alkaline earth thioaluminate;
(b) a rare earth or transition metal activated zinc selenide; and
(c) a rare earth or transition metal activated zinc sulfoselenide, wherein said phosphor film of (a), (b) and (c) is provided with an aluminum nitride barrier layer on a top and/or bottom side of the phosphor film.

19. The device of claim 18, wherein said aluminum nitride barrier layer has a thickness of about 30 nm to about 50 nm.

20. A method for making a stabilized phosphor laminate for use in a thick film dielectric electroluminescent device, said method comprising
(i) deposition of a phosphor selected from the group consisting of:
(a) a rare earth activated alkaline earth thioaluminate;
(b) a rare earth or transition metal activated zinc selenide; and
(c) a rare earth or transition metal activated zinc sulfoselenide, onto a glass or glass ceramic substrate incorporating a first set of address lines and a dielectric layer;
ii) deposition of a layer of aluminum nitride on top of said phosphor film of (a)-(c); and
iii) annealing said phosphor film at a temperature of up to about 1100° C.

21. The method of claim 20, wherein said method further comprises deposition of a layer of aluminum nitride on the bottom of said phosphor film of (a), (b), and (c).

22. The method of claim 21, wherein said aluminum nitride has a thickness of about 30 nm to about 50 nm.

23. The method of claim 22, wherein said aluminum nitride barrier layer is deposited by sputtering.

24. The method of claim 23, wherein said sputtering is conducted in a sputtering atmosphere of gases at a pressure of about 0.65 Pa to 3.5 Pa having a nitrogen to argon ratio of about 0:50 to 20:50 and a power density of about 2 to 6 watts per square centimeter.

25. The method of claim 24, wherein oxygen is added to said sputtering atmosphere.

26. The method of claim 22, wherein said aluminum nitride barrier layer is deposited by atomic layer chemical vapour deposition.

27. An improved phosphor film for a thick film dielectric electroluminescent display, said phosphor film selected from the group consisting of a transition metal activated zinc sulfide; wherein said phosphor film is provided with an aluminum nitride barrier layer on a top side of the phosphor film, said aluminum nitride barrier layer improving the stability of the interface between the phosphor film and the display; and further wherein said aluminum nitride barrier layer is about 30 nm to about 50 nm thick.

28. The phosphor of claim 27, wherein said transition metal activated zinc sulfide is represented by the formula ZnS:A where A is selected from manganese and terbium.

* * * * *